United States Patent
Lee et al.

(10) Patent No.: US 10,746,140 B2
(45) Date of Patent: Aug. 18, 2020

(54) FUEL INJECTION CONTROL SYSTEM AND METHOD

(71) Applicants: Hyundai Motor Company, Seoul (KR); Kia Motors Corporation, Seoul (KR)

(72) Inventors: Myung Jun Lee, Hwaseong-si (KR); Joon Kyu Lee, Yongin-si (KR); Soo Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/380,791

(22) Filed: Apr. 10, 2019

(65) Prior Publication Data

US 2020/0141367 A1    May 7, 2020

(30) Foreign Application Priority Data

Nov. 6, 2018    (KR) .................... 10-2018-0135178

(51) Int. Cl.
*F02M 31/18*    (2006.01)
*F02D 13/02*    (2006.01)

(52) U.S. Cl.
CPC ....... *F02M 31/183* (2013.01); *F02D 13/0249* (2013.01); *F02D 2200/021* (2013.01); *F02D 2200/0614* (2013.01); *F02D 2200/101* (2013.01)

(58) Field of Classification Search
CPC .............. F02M 31/183; F02D 13/0249; F02D 2200/021; F02D 2200/0614; F02D 2200/101
See application file for complete search history.

(56) References Cited

U.S. PATENT DOCUMENTS

| | | | |
|---|---|---|---|
| 2001/0045201 A1* | 11/2001 | Yoshizawa | F02B 1/12 123/299 |
| 2007/0062470 A1* | 3/2007 | Ashizawa | F02B 23/101 123/90.15 |
| 2015/0198104 A1 | 7/2015 | Haehara et al. | |

FOREIGN PATENT DOCUMENTS

| | | |
|---|---|---|
| JP | 2001-090514 A | 4/2001 |
| JP | 2011-252473 A | 12/2011 |
| JP | 2012-241542 A | 12/2012 |
| JP | 2016-011588 A | 1/2016 |
| JP | 2017-180189 A | 10/2017 |

* cited by examiner

*Primary Examiner* — Xiao En Mo
(74) *Attorney, Agent, or Firm* — Morgan, Lewis & Bockius LLP (57) ABSTRACT

A fuel injection control system may include a variable exhaust valve mechanism configured to primarily open an exhaust valve directly before an intake stroke in which an intake valve is opened and to secondarily open the exhaust valve during the intake stroke such that valve overlap occurs; an exhaust injector provided at an exhaust side to inject fuel; and a controller for controlling the exhaust injector such that fuel is injected through the exhaust injector before the exhaust valve is opened secondarily before or during the intake stroke.

11 Claims, 5 Drawing Sheets

FUEL INJECTION CONTROL SYSTEM AND METHOD

CROSS REFERENCE TO RELATED APPLICATION

The present application claims priority to Korean Patent Application No. 10-2018-0135178 filed on Nov. 6, 2018, the entire contents of which is incorporated herein for all purposes by this reference.

BACKGROUND OF THE DISCLOSURE

Field of the Disclosure

The present invention relates to a fuel injection control system and method for supplying fuel vaporized by exhaust heat into a combustion chamber to homogeneously form a mixture of fuel and air during an intake stroke.

Description of Related Art

In general, a gasoline engine draws a mixture of air and fuel and then burns the mixture by spark ignition whereas a diesel engine injects fuel into a high temperature and pressure atmosphere in a condition that only air is drawn in and then burns the fuel by compression ignition.

Furthermore, there is a homogeneous charge compression ignition (HCCI) combustion mode in which a mixture of fuel and air is mixed in advance to form a homogeneous mixture and then the mixture is burned by compression ignition.

There is also a premixed charge compression ignition (PCCI) combustion mode in which, in general, fuel is injected into a combustion chamber at the initial stage of compression to premix the fuel and air and then the mixture is burned by compression ignition.

On the other hand, although such premixed compression ignition combustion modes of a diesel engine are an ideal combustion mode configured for simultaneously reducing NOx and particulate matter (PM), there are problems in that it is difficult to precisely control ignition timing and combustion noise level is excessively high.

Moreover, diesel fuel makes it difficult to form a homogeneous mixture of air and fuel because the diesel fuel has a high evaporation temperature and thus does not evaporate smoothly in the combustion chamber.

To solve the present problem, a technology using a multi-stage injection or early injection mode for injectors has been provided. However, the present technology has problems in that time for forming homogeneous mixture is insufficient and low temperature of intake air impedes homogeneous mixing of the mixture of air and fuel.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fuel injection control system and method for supplying fuel vaporized by exhaust heat into a combustion chamber to homogeneously form a mixture of fuel and air during an intake stroke.

In one aspect of the present invention for accomplishing the object as mentioned above, there is provided a fuel injection control system including: a variable exhaust valve mechanism configured to primarily open an exhaust valve directly before an intake stroke in which an intake valve is opened and to secondarily open the exhaust valve during the intake stroke such that valve overlap occurs; an exhaust injector provided at an exhaust side to inject fuel; and a controller for controlling the exhaust injector such that fuel is injected through the exhaust injector before the exhaust valve is opened secondarily before or during the intake stroke.

The fuel injected from the exhaust injector may be evaporated by exhaust heat and premixed with exhaust gas, and the premixed fuel is supplied into a combustion chamber through the exhaust valve opened secondarily.

The exhaust injector may be configured to inject the fuel into an exhaust port or an exhaust manifold.

In another aspect of the present invention, there is provided a method for injecting fuel by the fuel injection system, including premixing of fuel and exhaust gas through controlling, by a controller, an exhaust injector such that the fuel is injected through the exhaust injector before an exhaust valve is opened secondarily before or during an intake stroke, wherein in the premixing of fuel and exhaust gas, the fuel injected from the exhaust injector is evaporated by exhaust heat and premixed with the exhaust gas, and the premixed fuel is supplied into a combustion chamber through the exhaust valve opened secondarily.

The method may comprise, prior to the premixing of the fuel and the exhaust gas, detecting engine RPM, fuel amount, exhaust gas temperature and cooling water temperature and determining whether the engine RPM, the fuel amount, the exhaust gas temperature and the cooling water temperature satisfy premixing conditions.

A ratio of an amount of the premixed fuel to a total fuel amount injected during one cycle may be 20% to 40%.

The method may further include injecting fuel through a main injector provided in the combustion chamber during an explosion stroke wherein fuel injection timing in the injecting fuel through a main injector is controlled to be −4° to 4° with respect to a top dead center (TDC).

According to an exemplary embodiment of the present invention accomplishing the means for solving problems as mentioned above, there is an effect in that in the case where the exhaust valve is opened secondarily before or during the intake stroke, the fuel injected from the exhaust injector is evaporated by exhaust heat and supplied into a cylinder so that the mixture of air and fuel is formed more homogeneously and supplied into the combustion chamber and thus partial premixed combustion of diesel fuel is optimized and, as a result, fuel efficiency and combustion noise level are improved without aggravating NOx and soot.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 1:
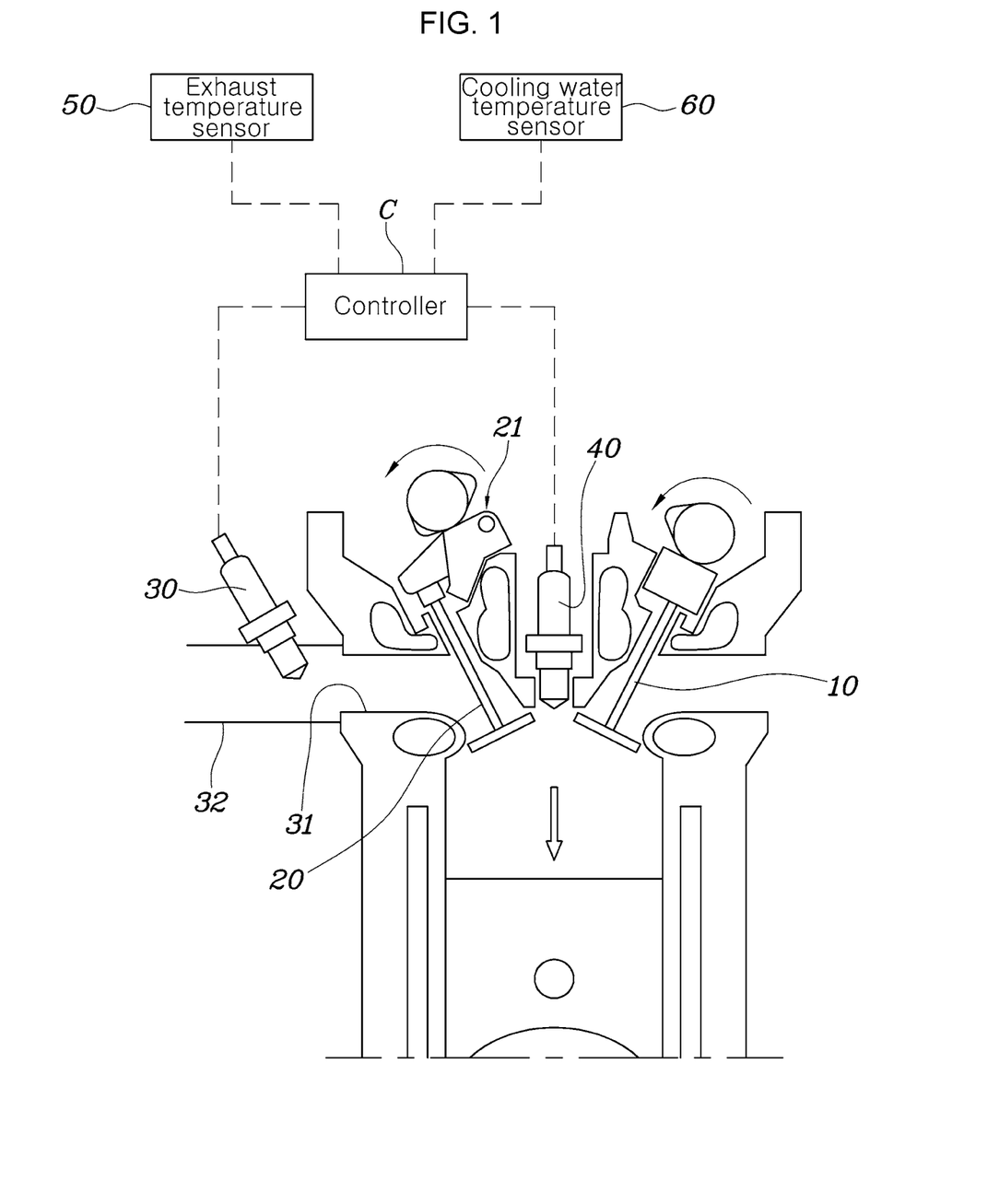
FIG. 1 is a diagrammatic view of the configuration of a fuel injection system according to an exemplary embodiment of the present invention.

A fuel injection system of an exemplary embodiment of the present invention includes a variable exhaust valve mechanism 21, an exhaust injector 30 and a controller C.

Referring to FIG. 1, the present invention will be described in detail. Firstly, the variable exhaust valve mechanism 21 is configured to primarily open an exhaust valve 20 directly before an intake stroke in which an intake valve 10 is opened and to secondarily open the exhaust valve 20 during the intake stroke such that valve overlap occurs.

Figure 2:
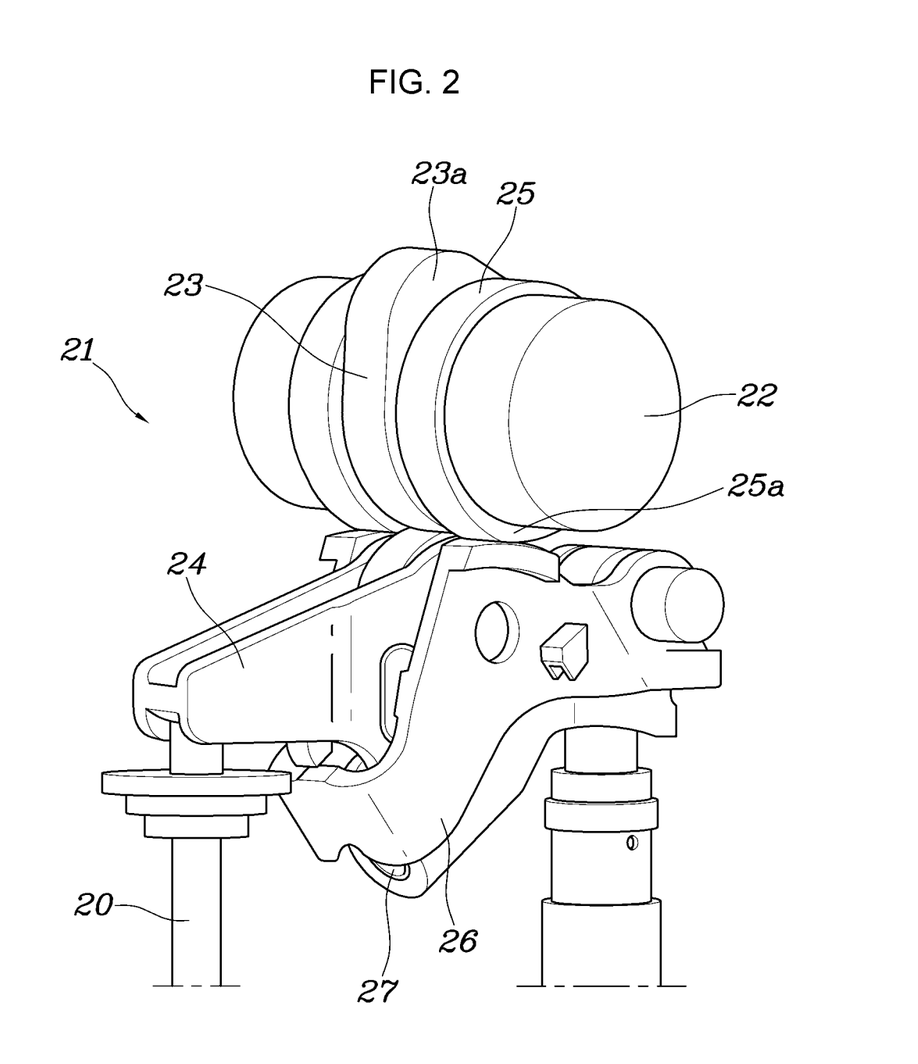
FIG. 2 and FIG. 3 are views showing the configuration and On/Off operation states of a variable exhaust valve mechanism applicable to the present invention.
Figure 3:
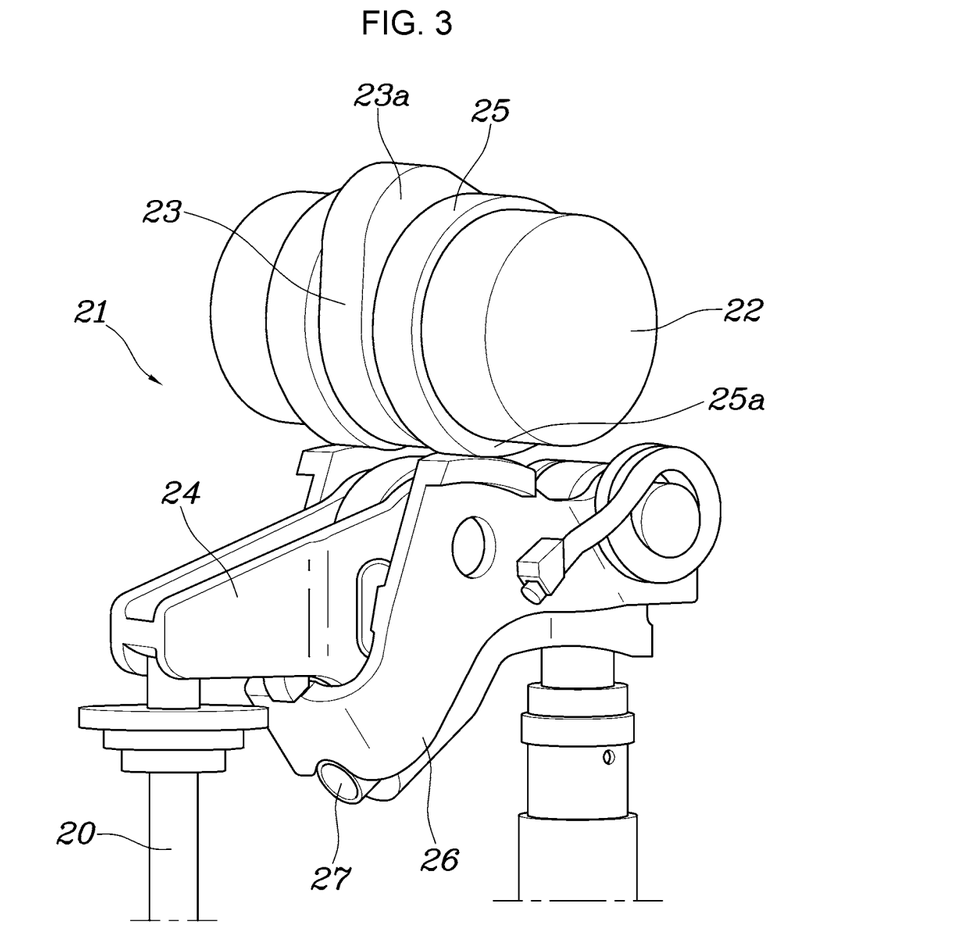

For example, a two-stage variable valve lift (VVL) system shown in FIG. 2 and FIG. 3 may be applied to the variable exhaust valve mechanism 21.

The variable exhaust valve mechanism 21 will now be described with reference to the drawings. A camshaft 22 is provided with a high cam 23 having a high cam lift and a low cam 25 having a low cam lift. A cam lobe 23a which is a protruding portion of the high cam 23 and a cam lobe 25a which is a protruding portion of the low cam 25 are disposed with a predetermined rotational displacement maintained therebetween in consideration of primary opening timing and secondary opening timing of the exhaust valve 20.

Furthermore, a high arm 24 is provided in a radial direction of the high cam 23 and a rotation shaft is provided at one end portion of the high arm 24 so that the other end portion of the high arm 24 rotates about the rotation shaft. The other end portion of the high arm 24 is positioned at top end portion of the exhaust valve 20 so that the other end portion of the high arm 24 presses the exhaust valve 20 by a rotation of the high arm 24 itself and thus the exhaust valve 20 is opened.

Furthermore, a low arm 26 is provided in a radial direction of the low cam 25 and one end portion of the low arm 26 is coupled to the rotation shaft so that the other end portion of the low arm 26 rotates about the rotation shaft.

Moreover, a middle end portion of the high arm 24 is provided with a locking pin 27 wherein relative rotation of the low arm 26 with respect to the high arm 24 is restrained when the locking pin 27 operates to protrude so that the high arm 24 and the low arm 26 rotate together, while the relative rotation of the low arm 26 with respect to the high arm 24 is changed to be permitted when the locking pin 27 protruded withdraws back to its original position so that the high arm 24 and the low arm 26 can rotate separately.

In an exemplary embodiment of the present invention, the locking pin 27 is operated to selectively protrude from the high arm by an actuator such as a device supplying hydraulic pressure to an end of the locking pin 27 or a solenoid connected to the end of the locking pin 27, which are controlled by the controller C.

Figure 4:
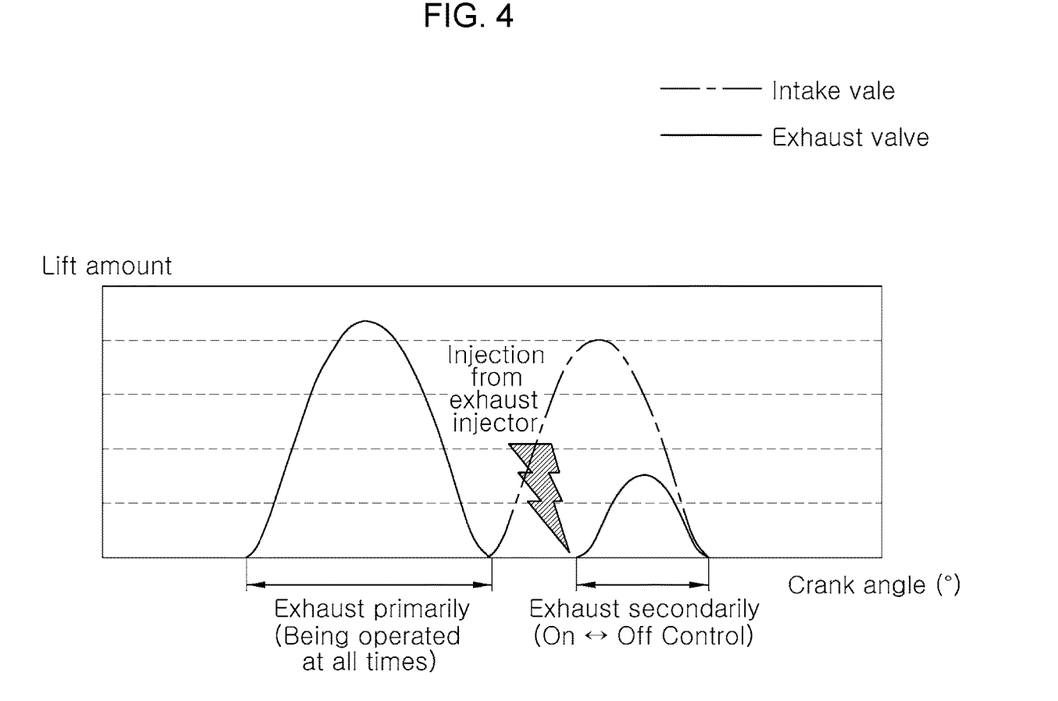
FIG. 4 is a view showing an opening/closing profile of intake and exhaust valves following operation of a variable exhaust valve mechanism of an exemplary embodiment of the present invention.

With the present configuration, when a camshaft 22 rotates in a state where the locking pin 27 has operated to protrude, the high arm 24 is pressed by the cam lobe 23a of the high cam 23 and thus the high arm 24 rotates while the other end portion of the high arm 24 presses the exhaust valve 20 so that the exhaust valve 20 is primarily opened by an amount of the cam lift formed on the high cam 23 in a similar way of a profile shown in FIG. 4.

In the instant state, when the camshaft 22 continues to rotate and presses the low arm 26 via the cam lobe 25a of the low cam 25, the low arm 26 rotates. At the instant time, as the relative rotation of the low arm 26 and the high arm 24 is restrained by the locking pin 27, the high arm 24 rotates together with the low arm 26 and thus the other end portion of the high arm 24 presses the exhaust valve 20 so that the exhaust valve 20 is secondarily opened by an amount of the cam lift formed on the low cam 25 in a similar way of the profile shown in FIG. 4.

In other words, utilizing the variable exhaust valve mechanism 21 as described above makes it possible to open the exhaust valve both before and during the intake stroke, respectively.

However, if the camshaft 22 rotates in the state where the locking pin 27 has not protruded, the exhaust valve 20 may be opened by the amount of the cam lift formed on the high cam 23 but, in the present state, the low arm 26 and the high arm 24 rotate relatively. Therefore, even if the low arm 26 is rotated by the low cam 25, the exhaust valve 20 is not opened so that the exhaust valve 20 may be opened only once.

Moreover, an exhaust injector 30 is provided at the exhaust side of the exhaust valve 20 to inject fuel as shown in FIG. 1.

For example, the exhaust injector 30 may be a low-pressure solenoid injector provided to inject diesel fuel into an exhaust port 31 or an exhaust manifold 32.

Furthermore, the exhaust injector 30 may form a cooling water circuit to ensure thermal durability of the exhaust injector 30 itself taking into consideration of its structural arrangement to be disposed at the exhaust side thereof. Otherwise, the exhaust injector 30 may be disposed at a position where a cooling water circuit formed in a cylinder head may be utilized (for example, it may be disposed on an exhaust manifold-integrated cylinder head).

Furthermore, the controller C can control the exhaust injector 30 such that fuel is injected through the exhaust injector before the exhaust valve 20 is opened secondarily before or during the intake stroke.

Therefore, the fuel injected from the exhaust injector is evaporated by exhaust heat and premixed with exhaust gas and then the premixed fuel is supplied into a combustion chamber through the exhaust valve 20 opened secondarily.

In other words, when the exhaust valve 20 is opened secondarily before or during the intake stroke, the fuel injected from the exhaust injector 30 may be introduced into a cylinder because exhaust pressure is higher than pressure inside the cylinder and the fuel injected from the exhaust injector 30 is evaporated by exhaust heat so that a mixture of air and fuel may be formed more homogeneously and supplied into a combustion chamber.

From now on, referring to FIG. 1, FIG. 2, FIG. 3, FIG. 4, and FIG. 5, a method for injecting fuel using the fuel injection system as discussed above will be described below. The present method includes a step of premixing fuel and exhaust gas, in which the controller C controls the exhaust injector 30 such that fuel is injected through the exhaust injector before the exhaust valve 20 is opened secondarily before or during the intake stroke.

In the step of premixing fuel and exhaust gas, the fuel injected from the exhaust injector is evaporated by exhaust heat and premixed with exhaust gas and then the premixed fuel is supplied into a combustion chamber through the exhaust valve 20 opened secondarily.

Furthermore, the method includes, prior to the step of premixing fuel and exhaust gas, a step of detecting engine RPM, fuel amount, exhaust gas temperature and cooling water temperature and a step of determining whether the engine RPM, the fuel amount, the exhaust gas temperature and the cooling water temperature satisfy premixing conditions.

In the instant case, the cooling water temperature may be measured by a cooling water temperature sensor 60 and the exhaust gas temperature may be measured by an exhaust temperature sensor 50 configured for measuring temperature of exhaust gas. However, detecting the exhaust gas temperature may be performed by determining temperature of exhaust gas through modeling of exhaust temperature instead of using the exhaust temperature sensor 50.

When determining whether the engine RPM and the fuel amount are within the range of operation which is effective for improving fuel efficiency and EM through the premixed combustion and determining whether the exhaust gas temperature is at a temperature which is effective for evaporating diesel fuel and at the same time does not ignite the diesel fuel injected to the exhaust side and determining whether the engine temperature based on the cooling water temperature is at a temperature suitable for evaporation and combustion of the diesel fuel are performed and, as a result, all of these conditions are determined to be satisfied, entering the step of premixing fuel and exhaust gas may be performed.

Furthermore, when entering the step of premixing fuel and exhaust gas, fuel may be injected such that a ratio of an amount of the premixed fuel to a total fuel amount injected during one cycle is 20% to 40%. The fuel injection may be controlled such that the ratio of an amount of the premixed fuel to a total fuel amount injected during one cycle is 30%.

For reference, the total fuel amount injected during one cycle is fixed to be constant, which may be controlled such that when the premixed fuel amount is increased or decreased, the fuel amount injected from a main injector as will be described later is increased or decreased.

Moreover, the method further includes a step of injecting fuel through a main injector 40 provided in the combustion chamber during an explosion stroke wherein fuel injection timing in the step of injecting fuel through a main injector is controlled to be −4° to 4° with respect to a top dead center (TDC). The fuel injection timing in the step of injecting fuel through a main injector may be −0.3° with respect to the TDC.

Figure 5:
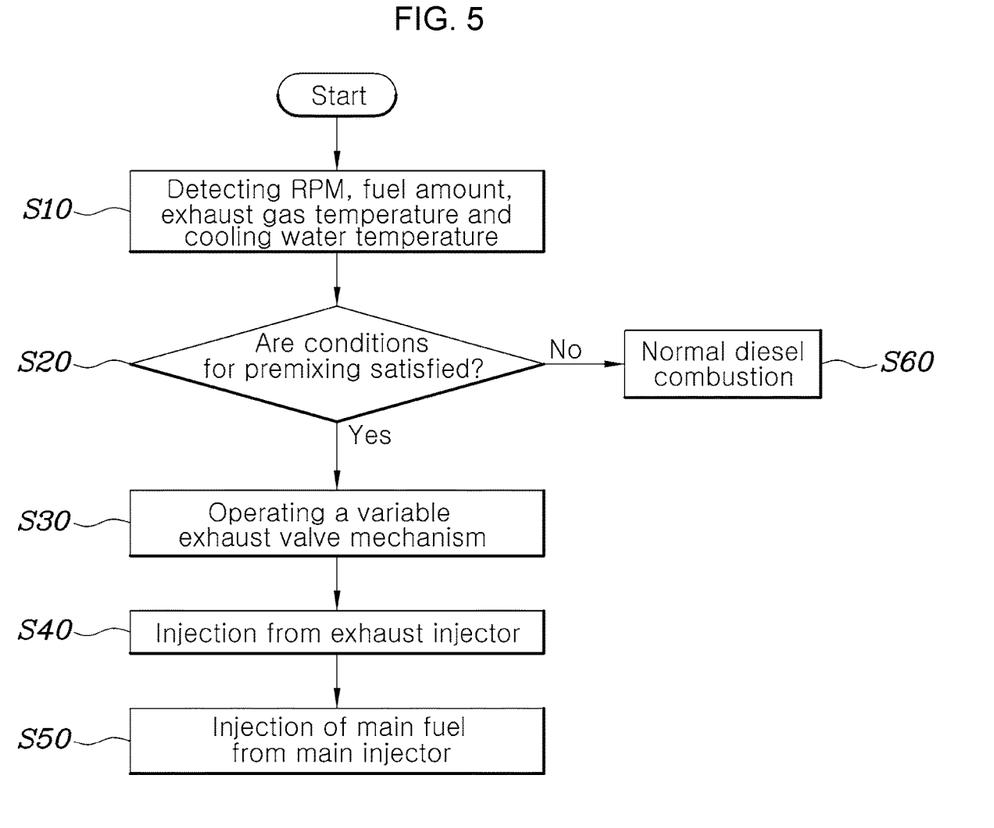
FIG. 5 is a view showing sequentially processes of a fuel injection method according to an exemplary embodiment of the present.

Referring to FIG. 5, processes for controlling fuel injection according to an exemplary embodiment of the present invention will now be described in the order. The engine rotation speed, the fuel amount, the exhaust gas temperature and the cooling water temperature are detected during operation of a vehicle in step S10.

As such, it is determined in step S20 that operation conditions of the vehicle satisfy the premixing conditions based on the detected factors as mentioned above. As a result of the determination, if the premixing conditions are satisfied, the variable exhaust valve mechanism 21 is operated and controlled in step S30 such that the exhaust valve 20 is opened primarily before the intake stroke and thereafter opened again secondarily during the intake stroke.

However, if it is determined in step S20 that the premixing conditions are not satisfied, fuel is injected and burned in a normal diesel combustion mode without operating the variable exhaust valve mechanism 21, in step S60.

On the other hand, when the variable exhaust valve mechanism 21 is operated as in step S30, the exhaust valve 20 is opened primarily and then closed and thereafter the exhaust valve 20 is opened secondarily before or during the intake stroke. At the instant time, the diesel fuel is injected through the exhaust injector 30 before the exhaust valve 20 is opened secondarily, in step S40.

Accordingly, the diesel fuel injected through the exhaust injector is evaporated by exhaust heat and the evaporated diesel fuel is mixed with air and introduced into the cylinder so that the mixture of fuel and air is formed more homogeneously.

Thereafter, the control process is proceeded to step S50 where fuel is injected from a main injector 40 while an air amount, exhaust gas recirculation (EGR) and injection amount and timing of main fuel are adjusted to be optimized in the premixed combustion so that partial premixed combustion of diesel fuel may be implemented, improving fuel efficiency and combustion noise level without aggravating NOx and soot.

Table 1 below shows the results obtained by applying a ratio of the premixed fuel and the injection timing of main fuel differently under a certain partial load operation point of an engine, at which brake mean effective pressure (BMEP) is 6 bar and an engine RPM is 2000 rpm. It may be confirmed from the table that when the ratio of premixed fuel was controlled to be 30% and the injection timing of main fuel was controlled to be −0.3° with respect to TDC, fuel efficiency and combustion noise level were improved without aggravating NOx and soot.

TABLE 1

| Amount of Premixed Fuel | Ratio of Premixed Fuel (Amount of Premixed Fuel/Total Amount of Fuel) | Injection Timing of Main Fuel | BSFC | NOx | Soot | CNL (Combustion Noise Level) |
|---|---|---|---|---|---|---|
| 2 to 4 mg | 10 to 20% | −4.4° TDC | Aggravated | — | Improved | Improved |
| 6 mg | 30% | −0.3° TDC | Improved | — | — | Improved |
| 8 to 10 mg | 40 to 50% | 4° TDC | Improved | Aggravated | Improved | Aggravated |

In other words, the evaporated fuel entered the cylinder by injection from the exhaust injector increases temperature inside the cylinder through activation of combustion so that combustion by injection of main fuel is strengthened and, as a result, combustion efficiency is increased and brake specific fuel consumption (BSFC) is improved.

Furthermore, thanks to the activation of combustion due to the fuel injection from the exhaust injector, heat generation gradient due to the fuel injection from the exhaust injector is remained small up to a predetermined amount of premixed fuel so that heat generation gradient due to the fuel injection from the main injector is reduced and, as a result, combustion noise level is reduced.

Moreover, the injection amount of main fuel by the main injector is decreased by the fuel injection from the exhaust injector and the injection timing of main fuel is retarded so that although oxidation rate of soot is reduced, generation amount of soot following main combustion is reduced and, as a result, amount of the soot may be maintained at the same level or otherwise reduced below the level.

As described above, according to an exemplary embodiment of the present invention, when the exhaust valve 20 is opened secondarily before or during the intake stroke, the fuel injected from the exhaust injector 30 is evaporated by exhaust heat and supplied into the cylinder so that the mixture of air and fuel is formed more homogeneously and supplied into the combustion chamber and thus the partial premixed combustion of diesel fuel is optimized and, as a result, fuel efficiency and combustion noise level are improved without aggravating NOx and soot.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel injection control system comprising:
    a variable exhaust valve mechanism configured to open an exhaust valve before an intake stroke in which an intake valve is opened and to open the exhaust valve during the intake stroke such that a valve overlap between the exhaust valve and the intake valve occurs;
    an exhaust injector provided at an exhaust side to inject fuel; and
    a controller configured for controlling the exhaust injector such that the fuel is injected through the exhaust injector before the exhaust valve is opened before or during the intake stroke,
    wherein the fuel injected from the exhaust injector is evaporated by exhaust heat and premixed with exhaust gas, and the premixed fuel is supplied into a combustion chamber through the exhaust valve opened before or during the intake stroke.

2. The system of claim 1, wherein the exhaust injector is configured to inject the fuel into an exhaust port or an exhaust manifold.

3. The system of claim 1, wherein the controller is configured to control the variable exhaust valve mechanism for opening the exhaust valve for a first predetermined time period and closing the exhaust valve and thereafter opening the exhaust valve for a second predetermined time period before or during the intake stroke.

4. A method for injecting the fuel by the fuel injection control system of claim 1, the method including:
    premixing the fuel and the exhaust gas through controlling the exhaust injector by the controller such that the fuel is injected through the exhaust injector before the exhaust valve is opened before or during the intake stroke,
    wherein in the premixing the fuel and the exhaust gas, the fuel injected from the exhaust injector is evaporated by the exhaust heat and premixed with the exhaust gas, and the premixed fuel is supplied into the combustion chamber through the exhaust valve opened.

5. The method of claim 4, wherein the premixing of the fuel and the exhaust gas includes:
    opening the exhaust valve for a first predetermined time period and closing the exhaust valve and thereafter opening the exhaust valve for a second predetermined time period before or during the intake stroke.

6. The method of claim 4, further including:
    prior to the premixing of the fuel and the exhaust gas, detecting revolutions per minute (RPM) of an engine, fuel amount, exhaust gas temperature and cooling water temperature and determining when the RPM of the engine, the fuel amount, the exhaust gas temperature and the cooling water temperature satisfy premixing conditions of premixing the fuel and the exhaust gas.

7. The method of claim 6, wherein the premixing of the fuel and the exhaust gas is performed when the engine RPM, the fuel amount, the exhaust gas temperature and the cooling water temperature satisfy the premixing conditions.

8. The method of claim 6, wherein the exhaust gas temperature is determined through modeling of the exhaust gas temperature.

9. The method of claim 4, wherein a ratio of an amount of the premixed fuel to a total fuel amount injected during one cycle is 20% to 40%.

10. The method of claim 4, further including:
after the fuel is injected through the exhaust injector, injecting fuel through a main injector provided in the combustion chamber during an explosion stroke.

11. The method of claim 10,
wherein fuel injection timing in injecting the fuel through the main injector is controlled to be −4° to 4° with respect to a top dead center (TDC).

* * * * *